United States Patent [19]

Nakamura et al.

[11] Patent Number: 5,760,567
[45] Date of Patent: Jun. 2, 1998

[54] INDUCED VOLTAGE REDUCTION METHOD AND AN INDUCED VOLTAGE REDUCTION APPARATUS FOR AN INDUCTION MOTOR

[75] Inventors: Kosei Nakamura, Oshino-mura; Yoshiyuki Hayashi, Sunto-gun; Hisashi Maeda, Oshino-mura, all of Japan

[73] Assignee: Fanuc, Ltd., Yamanashi, Japan

[21] Appl. No.: 564,053

[22] PCT Filed: Apr. 6, 1995

[86] PCT No.: PCT/JP95/00681

§ 371 Date: Dec. 14, 1995

§ 102(e) Date: Dec. 14, 1995

[87] PCT Pub. No.: WO95/28763

PCT Pub. Date: Oct. 26, 1995

[30] Foreign Application Priority Data

Apr. 18, 1994 [JP] Japan .................. 6-101742

[51] Int. Cl.$^6$ ............................................. H02P 1/38
[52] U.S. Cl. .......................... 318/777; 318/771; 318/778; 318/772; 318/727; 310/184; 310/198
[58] Field of Search ................................ 318/777, 771, 318/778, 772, 727; 310/184, 198

[56] References Cited

U.S. PATENT DOCUMENTS

| | | | |
|---|---|---|---|
| 4,477,760 | 10/1984 | Kuznetsov | 318/771 X |
| 4,947,072 | 8/1990 | Watkins et al. | 318/771 X |
| 5,065,305 | 11/1991 | Rich | 318/771 X |
| 5,068,559 | 11/1991 | Satake et al. | 318/771 X |
| 5,068,587 | 11/1991 | Nakamura | 318/771 |
| 5,352,964 | 10/1994 | Nakamura et al. | 318/771 X |

FOREIGN PATENT DOCUMENTS

| | | |
|---|---|---|
| 299739 | 1/1989 | European Pat. Off. |
| 547243 | 6/1993 | European Pat. Off. |

*Primary Examiner*—Karen Masih
*Attorney, Agent, or Firm*—Staas & Halsey

[57] ABSTRACT

A method and apparatus for controlling an induction motor having at least high speed windings and reduced speed windings divides the reduced speed windings into first and second portions. The first and second portions of the reduced speed windings are electrically connected in series and a voltage is applied to the first and second portions of the reduced speed windings when it is desired to operate the induction motor at a reduced speed. The first and second portions of the reduced speed windings are electrically disconnected and a voltage is applied to the high speed windings when it is desired to operate the induction motor at a high speed. The induction motor has three sets of windings extending from a middle region, each set of windings having an inner winding toward the middle region and an outer winding away from the middle region. According to one aspect, a first changeover circuit is electrically connected to each set of windings, between the inner and outer windings for applying a voltage to the outer windings when it is desired to operate the induction motor at a high speed. A second changeover circuit is electrically connected to each set of windings, toward the middle region from the inner windings for applying a voltage to the inner and outer windings when it is desired to operate the induction motor at a reduced speed. It is thus possible to change from a Y configured winding connection to a Δ configured winding connection.

9 Claims, 6 Drawing Sheets

LOW SPEED CONDITION S1 ON, S2 OFF

HIGH SPEED CONDITION S1 OFF, S2 ON

LOW SPEED CONDITION

MMC1 OFF
MMC2 ON

HIGH SPEED CONDITION

MMC1 ON
MMC2 OFF

LOW SPEED CONDITION

HIGH SPEED CONDITION

INDUCED VOLTAGE REDUCTION METHOD AND AN INDUCED VOLTAGE REDUCTION APPARATUS FOR AN INDUCTION MOTOR

TECHNICAL FIELD

This invention relates to a drive system for AC motors, and more particularly to a control system for reducing induced voltage to be generated in a winding for low-speed revolution of the induction motor.

BACKGROUND ART

The induction motor can produce a large torque at low-speed revolutions by switching the primary windings with the same primary current. In this case, the induction motor has windings forming a Y–Y connection, with first terminals supplying electric current to the entire part of the primary windings of U-, V- and W-phases and second terminals provided at an intermediate portion of each winding so as to supply electric current to only a part of each winding. Changeover of the primary windings is carried out in such a manner that electric power is exclusively supplied from the first terminals to supply electric current to the whole of each winding when the motor is to be operated in the low-speed region, while electric power is exclusively supplied from the second terminals to supply electric power to the limited part of each winding when the motor is to be operated in the high-speed region. Such a changeover of the primary windings causes the change of excitation.

In the low-speed rotations, the secondary current of the rotor and the output torque can be enlarged by increasing the number of turns of the primary winding under the same current. The above-described conventional induction motor has a problem such that driving the winding for high-speed revolutions of the induction motor cause the winding for low-speed revolutions to induce voltage, which may cause its dielectric breakdown.

FIG. 12 is a diagram illustrating an induced voltage in a conventional Y-connection type induction motor. In FIG. 12, the windings of U-, V- and W-phases are respectively constituted of a winding for high-speed revolution of motor C1 and a winding for low-speed revolution of motor C2 and serially connected to forms a Y connection. The winding for high-speed revolution of motor C1 has intermediate terminals U2, V2 and W2, while the winding for low-speed revolution of motor C2 has end terminals U1, V1 and W1.

Here, the induced voltage will be explained taking the case of the U-phase winding. While the winding for high-speed revolution of motor is in operation, the intermediate terminal U2 is used to exclusively supply electric current to the winding for high-speed revolution of motor C1, and no electric current is supplied to the winding for low-speed revolution of motor C2. However, the winding for low-speed revolution of motor C2 is made to induce voltage due to the voltage applied to the winding for high-speed revolution of motor C1. This induced voltage is proportional to the number of turns of the winding for high-speed revolution of motor C1 and that of the winding for low-speed revolution of motor C2. In general, in order to increase the output torque in the low-speed rotations, the number of turns of the low-seed winding C2 is set larger than that of the winding for high-speed revolution of motor C1. Therefore, the voltage induced in the winding for low-speed revolution of motor C2 is higher than the voltage applied to the winding for high-speed revolution of motor C1.

For example, if 200 V is applied to the winding for high-speed revolution of motor C1 under the condition that the number of turns ratio of the winding for high-speed revolution of motor C1 to the winding for low-speed revolution of motor C2 is 1:4, the winding for low-speed revolution of motor C2 will induce voltage of 200 (V)×4= 800 (V). This induced voltage may cause dielectric breakdown of the winding.

In the conventional induction motor, no special countermeasure is employed for preventing the voltage from being induced in the winding for low-speed revolution of motor when the induction motor is operated at high-speed revolutions, except for adjusting number of turns ratio by taking into account the induced voltage.

SUMMARY OF THE INVENTION

An object of the present invention is to provide an induced voltage reduction method and an induced voltage reduction apparatus capable of reducing the induced voltage in the winding for low-speed revolution of motor while the induction motor is operated using the winding for in the high-speed revolutions.

A first aspect of the present invention provides an induced voltage reduction method for an induction motor having a plurality of windings of different phases in Y connection and designed for having its drive controlled by changing the connection of the windings of the induction motor, wherein the winding for high-speed revolutions is disconnected from other windings while the winding for high-speed revolution of motor is in operation, and electric voltage is applied to the winding for high-speed revolution of motor, thereby reducing absolute value of induced voltage in the disconnected other windings. With this method, the object of the present invention is accomplished.

A second aspect of the present invention provides an induced voltage reduction apparatus for an induction motor having a plurality of windings of different phases in Y connection and designed for having its drive controlled by changing the connection of winding of the induction motor, the apparatus comprising: changeover circuit for changing the connection of the windings; and control circuit for controlling changeover operation of the changeover circuit; wherein the changeover circuit is controlled by the control circuit in such a manner that a winding for high-speed revolution of motor is disconnected from other windings while a winding for high-speed revolution of motor is in operation, thereby reducing absolute value of induced voltage in the disconnected other windings. With this apparatus, the object of the present invention is accomplished.

As a preferred embodiment of the induced voltage reduction apparatus according to the second aspect of the present invention, each winding of corresponding phase comprises a plurality of disconnectable windings having a predetermined number-of-turns ratio, and the disconnectable windings are connected to changeover switches constituting the changeover circuit so that the disconnectable windings are connected or disconnected by opening or closing the changeover switches.

A third aspect of the present invention provides an induced voltage reduction method for an induction motor having a plurality of windings of different phases in Y connection and designed for having its drive controlled by changing the connection of the windings of the induction motor, wherein the connection of windings is partially changed from the Y connection to Δ connection while a winding for high-speed revolution of motor is driven to reduce number-of-turns ratio of a winding for low-speed revolution of motor to a winding for high-speed revolution of motor, thereby reducing absolute value of induced voltage in the winding for low-speed revolution of motor. With this method, the object of the present invention is accomplished.

A fourth aspect of the present invention provides an induced voltage reduction apparatus for an induction motor having a plurality of windings of different phases in Y connection and designed for having its drive controlled by changing the connection of the windings of the induction motor, the apparatus comprising: changeover means for changing the connection of windings; and control means for controlling changeover operation of the changeover means, wherein the changeover means is controlled by the control means in such a manner that the connection of the windings is partially changed from the Y connection to a Δ connection while a winding for high-speed revolution of motor is in operation, thereby reducing absolute value of an induced voltage in a winding for low-speed revolution of motor. With this apparatus, the object of the present invention is accomplished.

As a preferred embodiment of the induced voltage reduction apparatus according to the fourth aspect of the present invention, each winding of corresponding phase comprises a plurality of disconnectable windings having a predetermined number-of-turns ratio, and ends of the disconnectable windings are connected to changeover switches constituting the switching unit so that the disconnectable windings are connected or disconnected by opening or closing the changeover switches, thereby changing the part of the connection of windings from the Y connection to the Δ connection.

Furthermore, in the induced voltage reduction apparatus according to the preferred embodiments of the second and fourth aspect of the present invention, the control circuit controls the changeover circuit in accordance with the speed of the induction motor.

The switching unit of the present invention has a function of changing the connection of the windings of different phases, and includes changeover switches for connecting and disconnecting windings. These changeover switches connect or disconnect the plural disconnectable windings constituting the windings of different phases in the case of the second aspect of present invention, and also connect or disconnect the ends of the windings of different phases in the case of the fourth aspect of the present invention. Furthermore, the changeover circuit is capable of connecting and disconnecting the windings of different phases, as well as capable of connecting and disconnecting the windings to or from the power unit. For example, the changeover circuit can be constituted of conductors such as relays.

Moreover, the control circuit of the present invention has a function of controlling changeover operation of the changeover unit. This control circuit has a function of setting the contents and timings of the changeover operation in accordance with the speed of the induction motor obtainable from a speed sensor or the like and a function for sending out the control signal to the changeover circuit. For example, the control circuit may be constituted of a CPU performing various processings and memories for storing the content of the switching operation, etc.

According to the first aspect of the present invention, in the drive control of the induction motor by changing the connection of windings of different phases in Y connection, windings except of the winding for high-speed revolution of motor of each phase is disconnected from each windings when the motor is operated by the winding for high-speed revolution of motor. This disconnection of winding has an effect of dividing the induced voltage into each disconnected windings by the unit of winding when the voltage is induced by the application of a voltage to the winding for high-speed revolution of motor. Such division of the induced voltage into the each disconnected windings reduces absolute value of the induced voltage. And, the reduction of the induced voltage prevents the dielectric breakdown.

Furthermore, according to the second aspect of the present invention, in an induction motor designed for having its drive controlled by changing the connection of the windings of different phases in Y connection, the control circuit controls the changeover circuit in the drive condition of winding for high speed revolution the induction motor. With this control by the control circuit, the changeover circuit disconnects the winding for high-speed revolution of motor from other windings in each phase of the induction motor. This kind of separation of the winding can be performed by dividing each phase winding into a plurality of windings so as to have a predetermined number of turns ratio, and connecting or disconnecting these windings by opening or closing the changeover switches constituting the switching unit. Such disconnection of winding makes it possible to divide the induced voltage into voltages corresponding to the separated windings when an electric voltage is applied to the winding for high-speed revolution of motor. Division of the induced voltage reduces absolute value of the induced voltage. The reduction of the induced voltage prevents the dielectric breakdown.

Still furthermore, according to the third aspect of the present invention, in the drive control of the induction motor by changing the connection of windings of different phases in Y connection, the connection of the windings is partially from the Y connection to the Δ connection while the motor is operated in a driving of winding for high-speed revolution. The Δ connection reduces number-of-turns ratio of the winding for low-speed revolution of motor to the winding for high-speed revolution of motor and also reduce the absolute value of the voltage induced in the winding for low-speed revolution of motor. The reduction of the induced voltage prevents the dielectric breakdown.

Yet further, according to the fourth aspect of the present invention, in an induction motor designed for having its drive controlled by changing the connection of the windings of different phases in Y connection, the control circuit controls the changeover circuit in a driving of winding for high-speed revolution of the induction motor. With this control by the control circuit, the changeover circuit partially changes the connection of the windings from the Y connection to the Δ connection in a driving of windings for high-speed revolution of the induction motor. The change of connection pattern of windings from the Y connection to the Δ connection can be made by dividing each winding of corresponding phase into a plurality of windings at a predetermined number-of-turns ratio, and connecting or disconnecting the ends of the windings by opening or closing the changeover switches constituting the switching unit. The Δ connection uses a larger number of windings than that used in the Y connection. As a result, the number-of-turns ratio of the winding for low-speed revolution of motor to the winding for high-speed revolution of motor is reduced, and the absolute value of the induced voltage in the winding for low-speed revolution of motor is reduced. And, the reduction of the induced voltage prevents the dielectric breakdown.

DESCRIPTION OF THE PREFERRED EMBODIMENTS

Hereinafter, embodiments of the present invention will be explained in detail with reference to the accompanying drawings.

Figure 1:
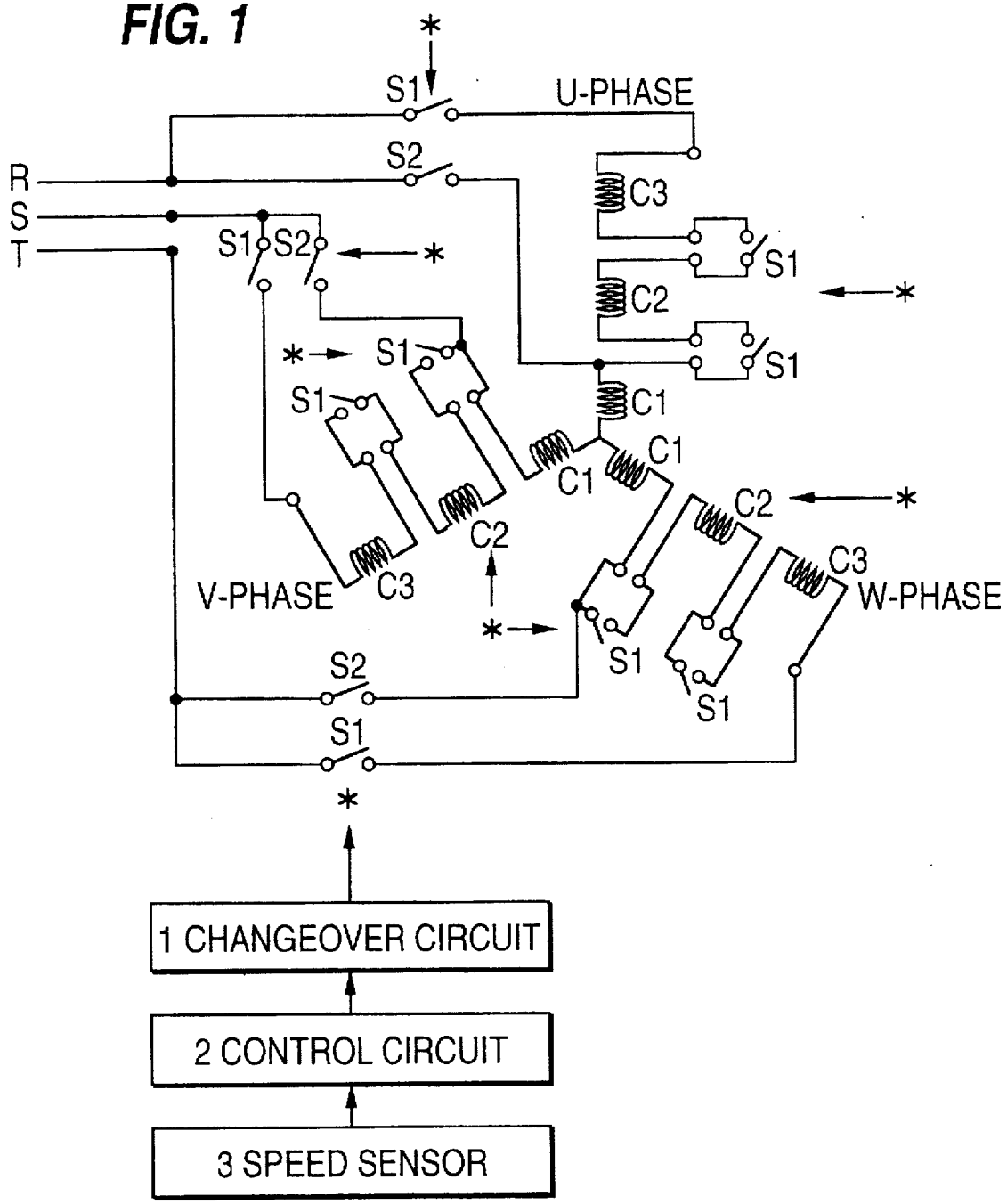
FIG. 1 is a diagram showing a composition of a first embodiment of the present invention for reducing induced voltage in the induction motor.

First, the arrangement of the first embodiment will be explained. FIG. 1 is a block diagram showing an arrangement of the first embodiment of the present invention for performing an induced voltage reduction method for an induction motor, and also an arrangement of a first embodiment of the present invention for obtaining an induced voltage reduction apparatus for the induction motor.

The induction motor shown in. FIG. 1 comprises a power unit (not shown) and a Y—Y winding (i.e. star-star winding). This Y—Y winding type induction motor is driven by a drive system generally known as a Y—Y winding switching system. In FIG. 1, C1 through C3 represent windings of a stator in the induction motor. Reference numeral 1 represents a changeover circuit for switching these windings, while S1 and S2 represent changeover switches. Reference numeral 2 represents a control circuit for controlling the changeover circuit 1. Reference numeral 3 represents a speed sensor for detecting a rotational speed of an induction motor. In the following explanation, the changeover circuit 1 and the changeover switches S1 and S2 are collectively treated as a switching unit.

The induction motor, in the case disclosed in the drawing, has a winding connection of three phases (i.e. U phase, V phase and W phase). Each phase comprises a plurality of windings C1, C2 and C3 separable from each other. Hereinafter, the U-phase winding is explained as an example. One end of the winding C1 of one phase is connected to one end of other windings C1 of other-phase, constituting a middle point. The other end of the winding C1 is connected to one end of the winding C2 via a changeover switch S1, and is also connected to the power unit (i.e. R phase in the drawing) via a changeover switch S2. Furthermore, the other end of the winding C2 is connected to one end of the winding C3 via the changeover switch S2. And, the other end of the winding C3 is connected to the power unit (i.e. R phase in the drawing) via the changeover switch S1.

The V-phase winding and W-phase windings are arranged in the same manner as the U-phase winding, with the other ends of winding C1 and winding for low-speed revolution of motor C3 connected to R- and T-phases of the power unit, respectively. In the above winding arrangement, the winding C1 constitutes a winding for high-speed revolution of motor, while the windings C2 and C3 constitute a winding for low-speed revolution of motor.

The number of disconnection of windings and the number of turns of winding used for constituting each-phase winding for low-speed revolution of motor may be determined by taking into account various conditions such as the output characteristics of the induction motor and an absolute value of the induced voltage to be generated in the winding for low-speed revolution of motor. The relation among the disconnected number of winding for low-speed revolution of motor, the separable of windings, and the induced voltage will be explained later in the section explaining the function of the embodiment.

The changeover switches S1 and S2, interposed between windings can be constituted by conductors, such as relays, which are opened or closed in response to the switching signal supplied from the changeover circuit 1. The switching signal, supplied from the changeover circuit 1 to respective changeover switches S1 and S2, is represented as an arrow marked by "*" in FIG. 1.

The changeover circuit 1, constituting a switching unit together with the changeover switches S1 and S2, executes the switching operation of the winding using the changeover switches S1 and S2. In the drawing, the changeover switches S1 and S2 are simultaneously operated for switching operation.

Furthermore, the control circuit 2 is, for example, constituted by a processor (CPU), memories such as ROM and RAM, an A/D converter and others. The control circuit 2 not only controls the power unit but also controls the changeover circuit 1 in accordance with the speed of the induction motor. The speed of the induction motor can be detected from a speed sensor 3 attached to the induction motor.

Although the arrangement of FIG. 1 is a case where the winding for high-speed revolution of motor is constituted by the winding C1 and the winding for low-speed revolution of motor by the windings C2 and C3, it is needless to say that the discrimination of windings is not limited to this embodiment, and, it will be possible to vary change the number of disconnection the winding. Furthermore, a winding for providing a middle-speed region, or a speed between high-speed revolution and low-speed revolution, can be formed. Even in these cases, the other windings than the winding for high-speed revolution of motor should be separated at least while the winding for high-speed revolution of motor is driven.

The function of the first embodiment arrangement for reducing the induced voltage will be explained hereinafter.

Figure 2:
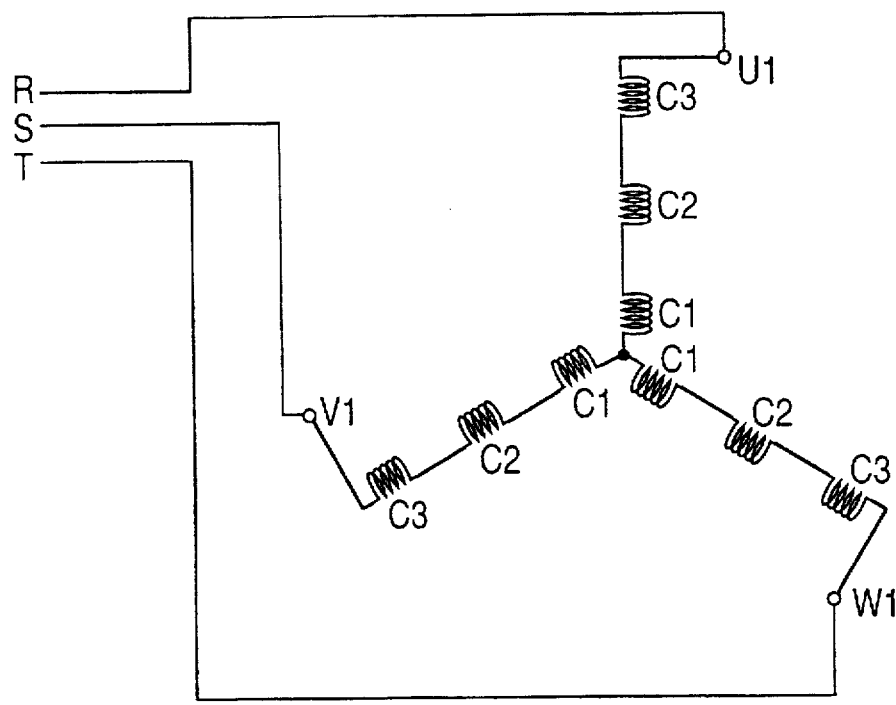
FIG. 2 is a connection diagram showing the connection of windings for the low-speed driving condition in accordance with the first embodiment of the present invention.

FIG. 2 shows one aspect of the winding connection in the first embodiment arrangement where one changeover switch S1 is turned on and the other changeover switch S2 is turned off. On the other hand, FIG. 3 shows another aspect of the winding connection in the first embodiment arrangement where one changeover switch S1 is turned off and the other changeover switch S2 is turned on.

In the winding connection of FIG. 2, the turning-on operation of the changeover switch S1 causes the series connection of the windings C1 through C3 in each phase of the induction motor. Furthermore, the power unit supplies electric current to the terminal of the winding C3 for low-speed revolution of motor by turning on the changeover switch S1 and turning off the changeover switch S2, thereby exciting the winding C1 for high-speed revolution of motor and the windings C2 and C3 for low-speed revolution of motor to drive a winding for low-speed revolution of motor of the induction motor. The drive of winding for low-speed revolution of motor generates a high torque in the low-speed region. For example, when 1 T represents the number of turns of the winding C1 for high-speed revolution of motor and 2 T the number of turns of each of the windings C2 and C3 for low-speed revolution of motor, the total number of turns becomes 5 T in the drive of winding for low-speed revolution of motor. Thus, as shown in FIG. 11, the motor can produce a high torque in the low-speed revolutions.

Figure 3:
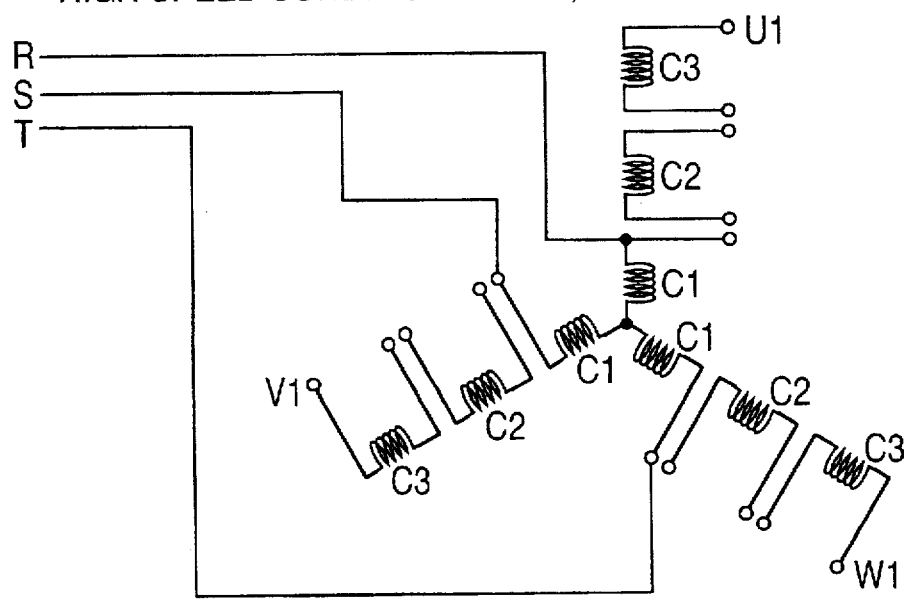
FIG. 3 is a connection diagram showing the connection of windings for the high-speed driving condition in accordance with the first embodiment of the present invention.

In the winding connection of FIG. 3, the turning-off operation of the changeover switch S1 disconnects the windings C1 through C3 in each phase of the induction motor so as to separate each winding from others. Furthermore, turning off changeover switch S1 and turning on changeover switch S2 will cause the power unit to supply electric current to the terminal of the winding C1 for high-speed revolution of motor to excite only the winding C1 for high-speed revolution of motor, leaving the winding for low-speed revolution of motor exclusively for low-speed revolutions disconnected from the winding C1 for high-speed revolution of motor. This drive of winding for high-speed revolution of motor causes a high torque in to be generated in the high-speed region. For example, when 1 T represents the number of turns of the winding C1 for high-speed revolution of motor and 2 T the number of turns of each of the windings C2 and C3 for low-speed revolution of motor as described above, only the number of turns 1 T of the winding C1 for high-speed revolution of motor in the drive of winding for high-speed revolution of motor. Thus, as shown in FIG. 11, the motor can produce a high torque in the high speed region.

Figure 11:
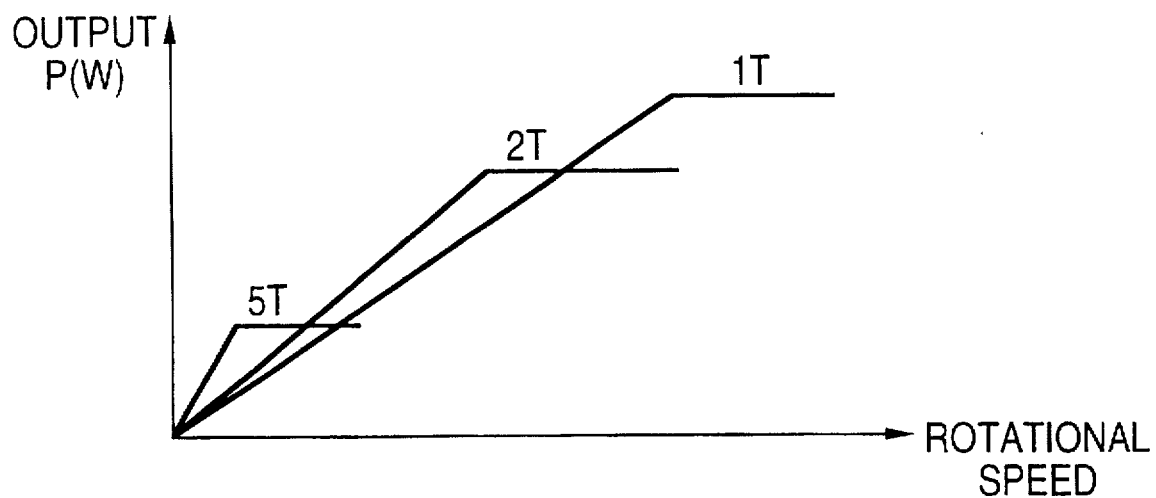
FIG. 11 is a diagram showing the output characteristics of an induction motor.
Figure 12:
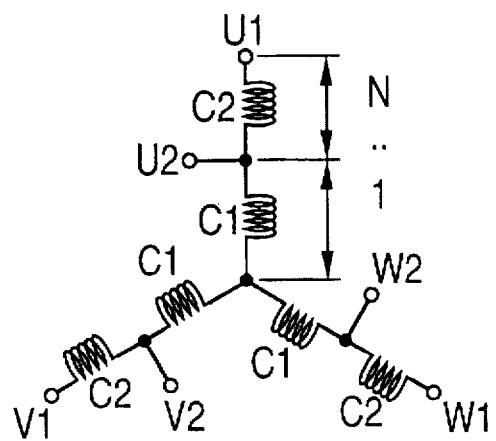
FIG. 12 is a diagram illustrating an induced voltage of a conventional Y-connection type induction motor.

FIG. 11 also shows the output characteristics of the motor driven by the winding having the number of turns 2 T, relative to the number of revolution. This output characteristics can be obtained when the winding for high-speed revolution of motor has the number of turns 2 T, or when only the winding C2 is activated, or when the winding C2 having the number of turns 1 T is activated together with the winding for high-speed revolution of motor, and so on.

Figure 4A:
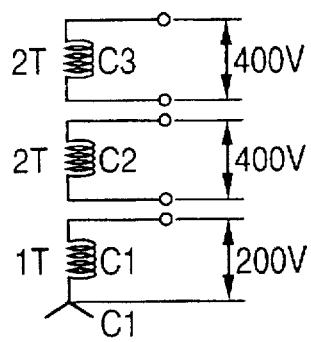
FIGS. 4A–4B are diagrams illustrating voltages applied to each winding and corresponding induced voltages in accordance with the first embodiment of the present invention.
Figure 4B:
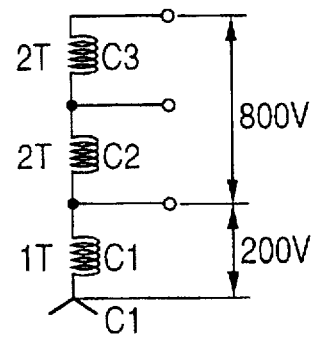

Next, the voltage condition of each winding in the first embodiment will be explained. FIGS. 4A and 4B are diagrams illustrating an applied voltage to each winding and an induced voltage. FIG. 4A shows the voltage condition of the winding in the first embodiment, while FIG. 4B shows the voltage condition of the winding in the conventional induction motor. FIGS. 4A and 4B shows the windings of only one phase, wherein the number of turns of winding C1 is 1 T and the number of turns of the windings C2 and C3 is 2 T, respectively. Accordingly, in this case, the number of turns becomes 1 T in drive of the winding for high-speed revolution of motor and 5 T in the drive of winding for low-speed revolution of motor, respectively.

When the winding C1 for high-speed revolution of motor is applied with a driving voltage of, for example, 200 V for a drive of winding for high-speed revolution of motor in the conventional induction motor as shown in FIG. 4B, voltages will be induced in the C2 and C3 other than the winding C1 for high-speed revolution of motor. As the windings C2 and C3 are connected, an absolute value of the induced voltage is 800 V which is proportional to 4 T, i.e. sum of number of turns of winding of respective windings. An absolute value of the voltage induced in the windings C2 and C3 other than the winding C1 for high-speed revolution of motor exceeds a threshold voltage causing a dielectric breakdown (e.g. approximately 600 V).

On the other hand, according to the first embodiment of the present invention, when the winding C1 for high-speed revolution of motor is applied with the same driving voltage of 200 V for the drive of winding for high-speed revolution of motor as shown in FIG. 4A, the induced voltage is generated in the windings C2 and C3 other than the winding for high-speed revolution of motor C1. Since the windings C2 and C3 are disconnected, an absolute value of the induced voltage is respectively 400 V which is proportional to 2 T, number of turns of each winding.

An absolute value of the induced voltage generated in the windings C2 and C3 other than the winding C1 for high-speed revolution of motor is within the threshold voltage causing the dielectric breakdown (e.g. approximately 600 V), whereby the dielectric breakdown can be prevented.

In the winding of each phase, the number of divisions the windings other than the winding for high-speed revolution of motor and the ratio of the number of turns of the divided winding to the number of turns of the winding for high-speed revolution of motor can be determined by taking into account of various conditions of the induction motor, such as the applied voltage value and the withstanding threshold voltage value for the dielectric breakdown, so that the absolute value of the induced voltage generated in each division of winding can be prevented from exceeding the withstanding threshold voltage value causing the dielectric breakdown.

Figure 5:
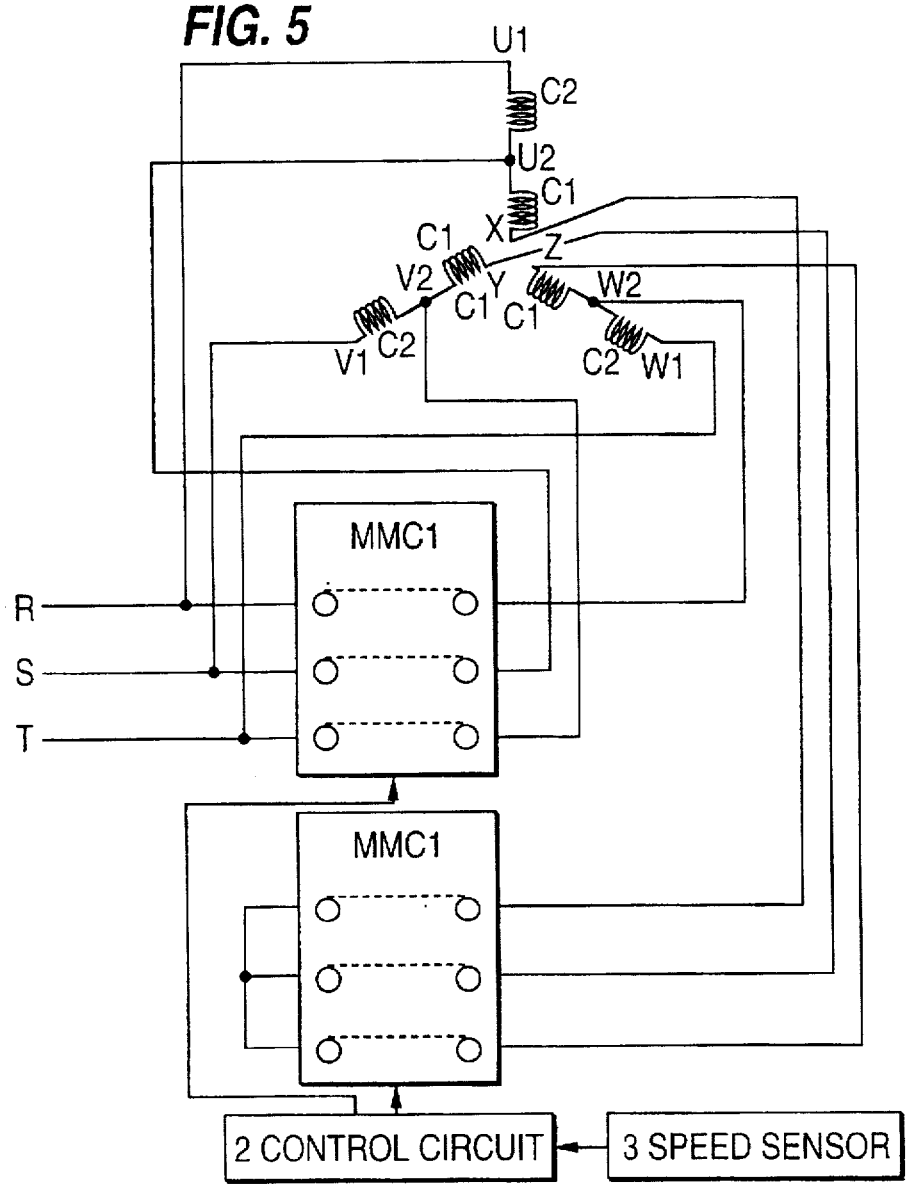
FIG. 5 is a diagram showing a composition of a second embodiment of the present invention for reducing induced voltage in the induction motor.

Next, the arrangement of the second embodiment will be explained. FIG. 5 is a block diagram showing an arrangement of the second embodiment for executing an induced voltage reduction method for an induction motor, and also a second embodiment for obtaining an induced voltage reduction apparatus for the induction motor.

The induction motor shown in FIG. 2 comprises a power unit (not shown) and a Y—Y connection (i.e. star-star connection winding), in the same manner as the above-described first embodiment. This Y—Y connection winding can drive an induction motor using a drive system generally known as a Y—Y connection winding switching system. In FIG. 2, C1 through C3 represent windings of a stator in the induction motor. Reference numeral 1 represents a changeover circuit for switching these windings C1 through C3, while MMC1 and MMC2 represent changeover circuits. Reference numeral 2 represents a control circuit for controlling the changeover circuits MMC1 and MMC2. Reference numeral 3 represents a speed sensor for detecting a rotational speed of an induction motor. The changeover circuits MMC1 and MMC2 have changeover switches corresponding to the number of phases, constituting a switching unit.

The induction motor, disclosed in FIG. 2, has a winding connection of three phases (i.e. U phase, V phase and W phase). Winding of each phase comprises a plurality of windings C1 and C2 separable from each other. Hereinafter, the U-phase winding is explained as an example. One end (X terminal) of the winding C1 is connected to the changeover circuit MMC2, while the other end (U2 terminal) of the winding C1 is connected to one end of the winding C2 and is also connected to the other changeover circuit MMC1. The other end (U1 terminal) of the winding C2 is connected to another terminal of the changeover circuit MMC1 and is also connected to the electric power unit (R phase in the drawing).

Other V-phase winding and W-phase winding are arranged in the same manner as the U-phase winding, with ends (U1, V1, W1) of windings C2 connected to R- and T-phases of the power unit, respectively. In the above winding arrangement, the winding C2 constitutes the winding for high-speed revolution of motor, while the winding C1 constitutes the winding for low-speed revolution of motor together with the winding C2, which is used only driving for the winding for low-speed revolution of motor.

The number of disconnection of windings and the number of turns of winding used for constituting winding of each phase can be determined by taking account of various conditions, such as the output characteristics of the induction motor and an absolute value of the induced voltage to be generated in the drive of winding for high-speed revolution of motor condition. The relation among the disconnection of the winding, the number of turns of disconnectable windings, and the induced voltage will be explained in the section describing the function of the embodiment which will be described later.

The changeover switches included in the changeover circuits MMC1 and MMC2, interposed between windings or between the winding and the power unit, can be constituted by conductors, such as relays, which are opened or closed in response to the switching signal supplied-from the changeover circuit 1.

The changeover circuit MMC1 has one end connected to the power unit and to the terminal (U1) of the winding C2 and the other end connected to the other terminal of the winding C2 and the terminal (U2) of the winding C1. The changeover circuit MMC1 operates for connection or disconnection in response to the control signal of the control circuit 2. Furthermore, the changeover circuit MMC2 has its one terminal short-circuited by mutual connection, and the other terminal connected to the end (X terminal) of the winding C1 which is not connected to the winding C2. This changeover circuit MMC2 connects or disconnects the terminals (Y terminal and Z terminal) of the windings C1 of respective phase, in response to the control signal from the control circuit 2.

The changeover operations by respective changeover switches provided in the changeover circuits MMC1 and MMC2 are simultaneously carried out in each changeover circuit.

Furthermore, the control circuit 2 is, for example, constituted by a processor (CPU), memories such as ROM and RAM, an A/D converter and others. The control circuit 2 not only controls the power unit but controls the changeover circuit 1 in accordance with the speed of the induction motor. The speed of the induction motor is obtainable from a speed sensor 3 attached to the induction motor.

According to the second embodiment of the present invention, the above-described arrangement of the winding and the changeover circuit realizes the switching of the winding pattern from the Y connection to the Δ connection in the drive of winding for high-speed revolution of motor condition. This Δ connection accomplishes the object of the present invention. The function of switching the Y connection to the Δ connection will be described in the section discussing the function of the second embodiment.

Although the arrangement of FIG. 5 shows the examples of the winding for high-speed revolution of motor constituted of the winding C2 and the winding for low-speed revolution of motor constituted of the winding C2, the division of windings is not limited to the disclosed embodiment. For example, it is possible to change the number of division of the winding. Furthermore, providing a winding for middle-speed revolution of motor will be desirable to realize an intermediate speed region between the high-speed and low-speed regions. Even in this case, the winding connection pattern of each phase should be of Δ connection at least in the drive of winding for high-speed revolution of motor drive condition.

The function of the arrangement of the second embodiment for reducing induced voltage will be explained hereinafter.

Figure 6:
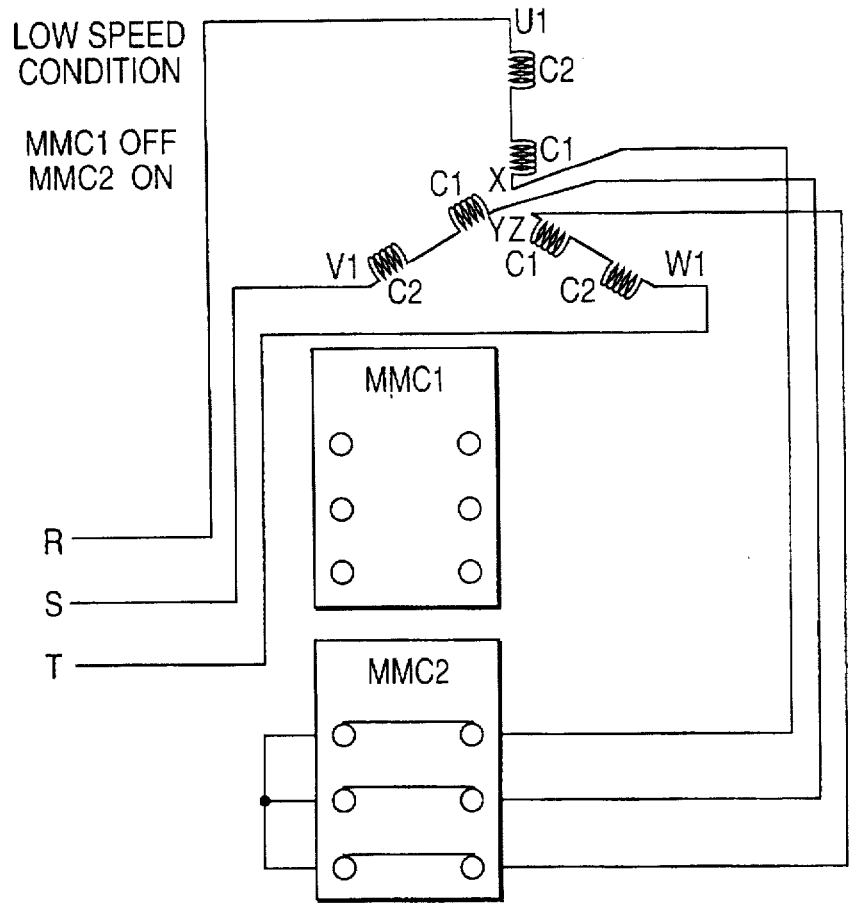
FIG. 6 is a connection diagram showing the connection of windings in the low-speed driving condition of the second embodiment of the present invention.
Figure 7:
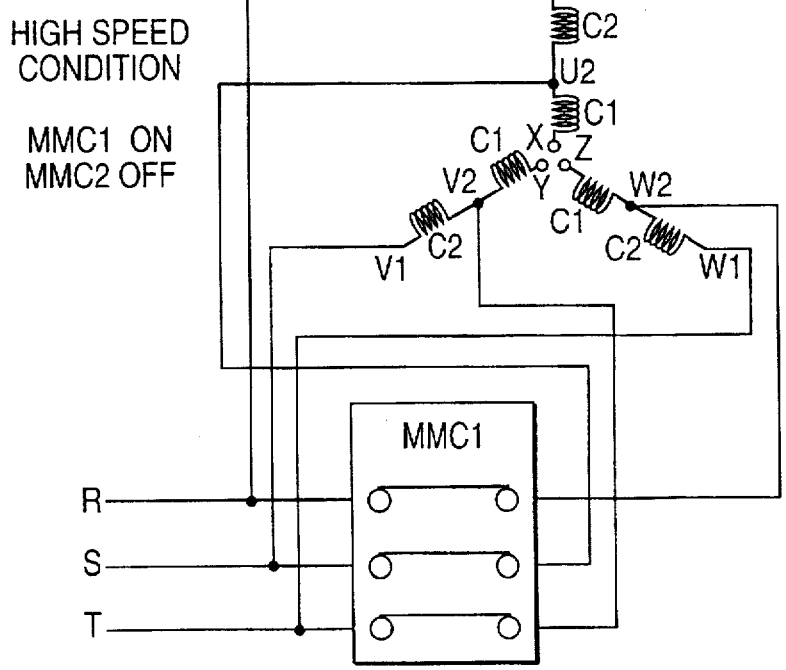
FIG. 7 is a connection diagram showing the connection of windings in the high-speed driving condition of the second embodiment of the present invention.

FIG. 6 shows one aspect of the winding connection in the arrangement of the second embodiment wherein one changeover circuit MMC1 is turned off and the other changeover circuit MMC2 is turned on. On the other hand, FIG. 7 shows another aspect of the winding connection in the arrangement of the second embodiment wherein one changeover circuit MMC1 is turned on and the other changeover circuit MMC2 is turned off. Hereinafter, the case of U-phase winding will be explained.

In the winding connection of FIG. 6, the turning-off operation of the changeover circuit MMC1 stops the electric-current to be supplied to the intermediate terminal (i.e. U2 terminal) between the windings C1 and C2, allowing the electric current to flow only to the U1 terminal of the winding C2. On the other hand, the turning-on operation of the changeover circuit MMC2 causes the X terminal, Y terminal and Z terminal of windings C1 of each phase to be connected to form a neutral point. Thus, the winding C2 for high-speed revolution of motor and the winding C1 are both activated to drive the winding for low-speed revolution of motor of the induction motor. Driving this winding for low-speed revolution of motor will make it possible to generate a high torque in the low-speed region as shown in FIG. 11.

Furthermore, in the winding connection of FIG. 7, the turning-off operation of the MMC2 will cause the X terminal, Y terminal and Z terminal of windings C1 of each phase to be disconnected. Furthermore, the turning-on operation of the changeover circuit MMC1 allows the electric current to flow from the power unit to the U1 terminal of the winding C2 and also to the intermediate terminal (W2 terminal) between the winding C2 and the winding C1 for high-speed revolution of motor, thereby changing the Y connection to the Δ connection. Then, the winding for high-speed revolution of motor of the induction motor is driven by activating the winding C2 for high-speed revolution of motor of Δ connection. Driving this winding for high-speed revolution of motor will cause a high torque to be generated in the high speed region.

Figure 8:
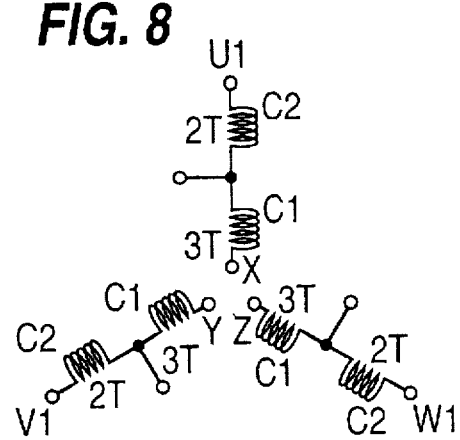
FIG. 8 is a diagram solely showing the composition in accordance with the second embodiment of the present invention.

Next, the voltage condition of each winding and change of winding connection from the Y connection to the Δ connection will be explained in accordance with the second embodiment. FIG. 8 shows the arrangement of the winding connection in accordance with the second embodiment of the present invention. For example, in the U-phase winding, one end of the winding C2 for high-speed revolution of motor is connected to the U1 terminal, while the U2 terminal is connected to the other end of the winding C2 for high-speed revolution of motor and also connected to one end of the winding C1, and further the X terminal is connected to the other end of the winding C1.

Figure 9:
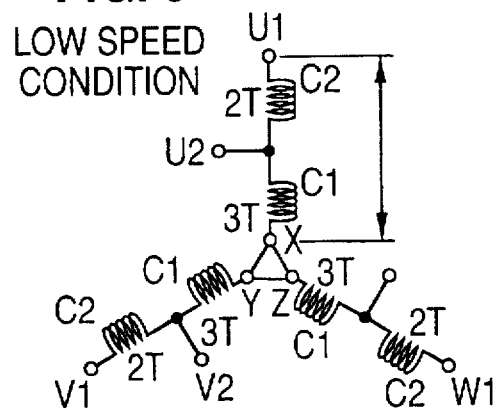
FIG. 9 is a connection diagram showing the connection of windings in the low-speed driving condition in accordance with the second embodiment of the present invention.

FIG. 9 shows the winding connection in the drive of winding for low-speed revolution of motor condition of the winding arrangement of FIG. 8. In this case, as described previously, the operation of changeover circuit causes the X-, Y- and Z-terminals to be connected. Then, the power unit applies a voltage to the winding C2 for high-speed revolution of motor and the winding C1 between the U1 terminal and the X terminal. Thus, the induction motor is driven by the Y connection. In this case, when the number of turns of winding C2 for high-speed revolution of motor and the number of turns of winding C1 are set, for example, to 2 T and 3 T respectively in order that the number of turns of winding in a high-speed drive and the number of turns of winding in a low-speed drive are 1 T and 5 T respectively in the same manner as in the case of a conventional induction motor, the ratio of the number of turns of the winding C2 for high-speed revolution of motor to the number of turns of the winding C1 is 1.5 (=3 T/2 T).

Figure 10A:
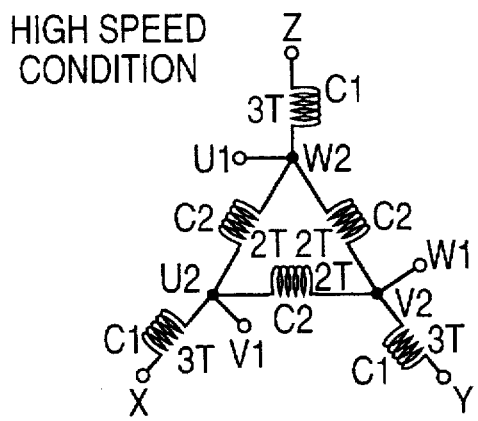
FIGS. 10A and 10B are connection diagrams showing the connection of windings in the high-speed driving condition in accordance with the second embodiment of the present invention.
Figure 10B:
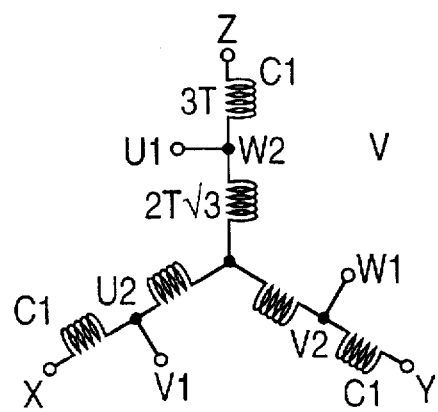

FIGS. 10A and 10B show the winding connection of the drive of winding for high-speed revolution of motor condition in the winding arrangement of FIG. 8. In this case, as shown in FIG. 10A, the changeover circuit operates so as to disconnect the X-, Y- and Z-terminals and to connect the U1 terminal with the W2 terminal, thereby forming the Δ connection of winding C2 for high-speed revolution of motors.

FIG. 10B shows a Y connection electrically equivalent to the Δ connection shown in FIG. 10(a). When the power unit applies its voltage to the U1 terminal and the W2 terminal, the number of turns the equivalent winding between the U1 terminal and the neutral point will become $2\ T/3^{1/2}$ (approximately 1.15 T) if the number of turns of the winding for high-speed revolution of motor is 2 T. Accordingly, the ratio of the number of turns of the winding C1 to that of the winding C2 for high-speed revolution of motor becomes approximately 2.6 (=3 T/(2 $T/3^{1/2}$)). Where the number of turns of the winding for high-speed revolution of motor to be driven and the number of turns of the winding for low-speed revolution of motor to be driven are 1 T and 5 T respectively, the ratio of the number of turns of the winding in a conventional induction motor is 4 (=4 T/1 T), while the ratio of the same in the case of the second embodiment of the present invention is about 2.6, indicating that the ratio of the number of turns can be reduced with the embodiment of the present invention.

More specifically, if a driving voltage of for example 200 V is applied to the winding for high-speed revolution of motor C1 of the conventional induction motor in the drive of winding for high-speed revolution of motor condition thereof as shown in FIG. 4B, the absolute value of the voltage induced in the windings C2 and C3 other than the winding C1 for high-speed revolution of motor becomes 800 V which is proportional to the sum 4 T of the numbers of turns respective windings as the windings C2 and C3 are connected to each other. The absolute value of the voltage induced in the windings C2 and C3 other than the winding C1 for high-speed revolution of motor exceeds the causing breakdown voltage (e.g. approximately 600 V).

In contrast, according to the second embodiment, when Δ connection is employed, the induced voltage of winding C1 becomes 520 V (=200 V×2.6), and the absolute value the voltage induced in the winding 1 other than the winding C2 for high-speed revolution of motor becomes lower than the breakdown voltage (ex. about 600 V), so that the insulation breakdown of the winding can be prevented.

Hence, according to the second embodiment of the present invention, the ratio of the number of turns the winding for low-speed revolution of motor to that of the winding for high-speed revolution of motor can be reduced by partially changing the winding connection pattern to the Δ connection in the drive winding for high-speed revolution of motor condition, whereby, the absolute value of the induced voltage in the winding for low-speed revolution of motor can be reduced to prevent the insulation breakdown of the winding.

In the winding of each phase, the number of turns of the winding for high-speed revolution of motor and those of the windings other than the winding for high-speed revolution of motor can be determined by taking into account of various conditions of the induction motor, such as the applied voltage value and the withstanding threshold voltage value for the insulation breakdown, so that the absolute value of the induced voltage in each winding can be suppressed so as not to exceed the withstanding threshold voltage value for the breakdown.

As explained above, the present invention makes it possible to provide an induced voltage reduction method and an induced voltage reduction apparatus capable of reducing the induced voltage in the low-speed wiring during the drive of high-speed wiring of the induction motor.

We claim:

1. An apparatus for controlling an induction motor having at least high speed windings and reduced speed windings and having a Y configured winding connection, comprising:

a divider for dividing the reduced speed windings into first and second portions;

a changeover device electrically connecting the first and second portions of the reduced speed windings in series and for electrically disconnecting the first and second portions of the reduced speed windings; and a controller, connected to the changeover device, for electrically connecting the first and second portions of the reduced speed windings in series and applying a voltage to the first and second portions of the reduced speed windings when it is desired to operate the induction motor at a reduced speed and for electrically disconnecting the first and second portions of the reduced speed windings and applying a voltage to the high speed windings when it is desired to operate the induction motor at a high speed.

2. The induced voltage reduction apparatus for an induction motor according to claim 1, wherein each winding of corresponding phase comprises a plurality of disconnectable windings having a predetermined ratio of number of turns of windings, and said disconnectable windings are connected to changeover switches constituting said changeover device so that said disconnectable windings are connected or disconnected by opening or closing said changeover switches.

3. The induced voltage reduction apparatus for an induction motor according to claim 1, wherein said control means controls said changeover device in accordance with a speed of said induction motor.

4. An induced voltage reduction apparatus for an induction motor having a plurality of windings of different phases in Y connection and being controlled by changing the connection of the windings, comprising:

changeover means for changing the connection of said windings, and control means for controlling changeover operation of said changeover means, wherein said control means controls so that the connection of said windings is changed from the Y-connection to a Δ connection while the windings for high-speed revolutions are driven, thereby reducing absolute value of induced voltage in the windings for low-speed revolutions.

5. The induced voltage reduction apparatus for an induction motor according to claim 4, wherein each winding of corresponding phase comprises a plurality of disconnectable windings having a predetermined ratio of number of turns, and ends of said disconnectable windings are connected to changeover switches constituting said changeover means so that said disconnectable windings are connected or disconnected by opening or closing said changeover switches, thereby changing the connection of said windings from the Y connection to the Δ connection.

6. The induced voltage reduction apparatus according to claim 4, wherein the induction motor has three sets of windings extending from a middle region, each set of windings having an inner winding toward the middle region and an outer winding away from the middle region, wherein for each set of windings, said control means causes the inner and outer windings to be connected in series and voltages to be applied to the inner and outer windings when it is desired to operate the induction motor at a reduced speed, and wherein for each set of windings, said control means causes the inner windings to be disconnected and voltages to be applied to the outer windings when it is desired to operate the induction motor at a high speed.

7. The induced voltage reduction apparatus according to claim 4, wherein the induction motor has three sets of windings extending from a middle region, each set of windings having an inner winding toward the middle region and an outer winding away from the middle region, and wherein the changeover means comprises:

a first changeover circuit electrically connected to each set of windings, between the inner and outer windings for applying a voltage to the outer windings when it is desired to operate the induction motor at a high speed; and a second changeover circuit electrically connected to each set of windings, toward the middle region from the inner windings for applying a voltage to the inner and outer windings when it is desired to operate the induction motor at a reduced speed.

8. A method for controlling an induction motor having at least high speed windings and reduced speed windings and having a Y configured winding connection, comprising the steps of:

dividing the reduced speed windings into first and second portions;

electrically connecting the first and second portions of the reduced speed windings in series and applying a voltage to the first and second portions of the reduced speed windings when it is desired to operate the induction motor at a reduced speed; and electrically disconnecting the first and second portions of the reduced speed windings and applying a voltage to the high speed windings when it is desired to operate the induction motor at a high speed.

9. A method for controlling an induction motor having at least high speed windings and reduced speed windings, comprising the steps of:

dividing the reduced speed windings into first and second portions;

electrically connecting the first and second portions of the reduced speed windings in series and applying a voltage to the first and second portions of the reduced speed windings when it is desired to operate the induction motor at a reduced speed;

electrically disconnecting the first and second portions of the reduced speed windings and applying a voltage to the high speed windings when it is desired to operate the induction motor at a high speed; and changing from a Y configured winding connection to a Δ configured winding connection.

* * * * *